United States Patent
Urch et al.

(10) Patent No.: US 12,054,287 B2
(45) Date of Patent: Aug. 6, 2024

(54) CARGO HOLD OF AN AIRCRAFT WITH CLADDING ELEMENTS AND AT LEAST ONE HOUSING ELEMENT

(71) Applicant: TELAIR INTERNATIONAL GMBH, Miesbach (DE)

(72) Inventors: Matthias Urch, Egmating (DE); Torsten Weise, Schliersee (DE)

(73) Assignee: TELAIR INTERNATIONAL GMBH, Miesbach (DE)

( * ) Notice: Subject to any disclaimer, the term of this patent is extended or adjusted under 35 U.S.C. 154(b) by 105 days.

(21) Appl. No.: 17/743,270

(22) Filed: May 12, 2022

(65) Prior Publication Data
US 2022/0363391 A1 Nov. 17, 2022

(30) Foreign Application Priority Data
May 14, 2021 (DE) .......................... 102021112580.4

(51) Int. Cl.
*B64D 9/00* (2006.01)
*B64C 1/06* (2006.01)
*B64D 41/00* (2006.01)

(52) U.S. Cl.
CPC .............. *B64D 9/003* (2013.01); *B64C 1/066* (2013.01); *B64D 41/00* (2013.01)

(58) Field of Classification Search
CPC .......... B64D 9/003; B64D 41/00; B64C 1/066
See application file for complete search history.

(56) References Cited

U.S. PATENT DOCUMENTS

| 6,328,154 B1 | 12/2001 | Huber | |
| 2004/0129445 A1* | 7/2004 | Winkelbach | B64C 1/18 174/76 |
| 2005/0044712 A1* | 3/2005 | Gideon | B64D 13/06 29/527.3 |
| 2005/0082431 A1* | 4/2005 | Scown | B64C 1/406 244/119 |
| 2006/0038077 A1 | 2/2006 | Olin et al. | |
| 2007/0252041 A1* | 11/2007 | Ebner | F16B 21/09 244/131 |
| 2011/0297805 A1* | 12/2011 | Jager | H05K 5/0204 29/428 |
| 2017/0274974 A1 | 9/2017 | Hegenbart et al. | |
| 2021/0344179 A1* | 11/2021 | Mourieras | H02G 1/08 |

FOREIGN PATENT DOCUMENTS

| DE | 19807231 | 9/1999 |
| DE | 10248241 | 5/2004 |
| DE | 102005026898 | 1/2006 |
| DE | 102009008847 | 8/2010 |

(Continued)

*Primary Examiner* — Tye William Abell
(74) *Attorney, Agent, or Firm* — Barnes & Thornburg LLP (57) ABSTRACT

A cargo hold of an aircraft having cladding elements and at least one housing element for accommodating electronic components and/or cables. The cladding elements are attached to supports, in particular structural elements, of the aircraft and have a plurality of cladding holes with predefined cladding hole spacings for attachment. The at least one housing element has at least one pair of housing holes for receiving fastening devices. The housing holes have a housing hole spacing which corresponds to at least one pair of cladding hole spacings.

12 Claims, 6 Drawing Sheets

(56) References Cited

FOREIGN PATENT DOCUMENTS

| EP | 0614258 | 9/1994 |
|----|---------|--------|
| EP | 3222513 | 9/2017 |
| FR | 3085089 | 2/2020 |
| WO | WO 2014/135912 | 9/2014 |
| WO | 2020/038701 | 2/2020 |

* cited by examiner

CARGO HOLD OF AN AIRCRAFT WITH CLADDING ELEMENTS AND AT LEAST ONE HOUSING ELEMENT

CROSS REFERENCE TO RELATED APPLICATIONS

This application claims priority to German Patent Application No. 102021112580.4, filed May 14, 2021. The disclosure set forth in the referenced applications is incorporated herein by reference in its entirety.

FIELD OF THE DISCLOSURE

The invention relates to a cargo hold of an aircraft having cladding elements and at least one housing element for housing electronic components and/or cables, and a method for mounting housing elements in a cargo hold of an aircraft.

BACKGROUND

Aircraft cargo holds usually have cargo loading systems with roller conveyors driven by roller drive units. In this way, the movement of cargo items, which are usually loaded on pallets or in containers, on the roller conveyors during the loading and unloading process is considerably simplified. To control the roller drive units, a cargo hold usually has several similar control units with which the loading personnel can move the cargo items on the roller conveyors. For this purpose, the control units must be connected to the roller drive units via electrical lines. Typically, the control units are located on the lateral interior cladding of the aircraft at a suitable height above the cargo hold floor so that the loading personnel can operate them comfortably while standing.

A conventional installation of such a cargo hold provides for the control panels to be recessed into the cladding elements of the aircraft. This presupposes that suitable cutouts are provided in the cladding elements. The cables for the supply of the control panels are often routed underneath the cladding elements.

Such an installation entails various disadvantages in practical implementation. The cutout made to install a control panel in a cladding element destroys a fire barrier that must be restored due to official fire safety requirements. This is done by inserting troughs of fire-resistant material, such as fiberglass, into the cutouts. A control panel can then be mounted in such a trough, again with a front panel made of fire-resistant material.

In addition, laying the cables underneath the cladding elements is extremely complicated in practice. The cables must be attached to the structural elements of the aircraft below the cladding elements, where various other cable systems may already be present. Spacers and brackets must be installed in order to comply with the separation rules prescribed by the authorities for other cable systems.

The described installation of such a cargo hold, for example in the course of a retrofit, is therefore complex to implement and also requires special materials with usually high purchase prices. Subsequent maintenance of such a system is also difficult, as the cladding elements have to be dismantled in order to inspect the cables.

Based on the prior art, it is the object of the invention to offer an improved cargo hold. In particular, the installation and maintenance of such a cargo hold should be as simple as possible. Furthermore, the components used should be producible in a simple and inexpensive manner.

SUMMARY

This object is solved by a cargo hold according to the present disclosure.

In particular, the object is solved by a cargo hold comprising cladding elements attached to supports, in particular structural elements, of the aircraft, wherein the cladding elements have a plurality of cladding holes with (predefined) cladding hole spacings for attachment. Furthermore, the cargo hold comprises at least one housing element for housing electronic components and/or cables, wherein the housing element has at least one pair of housing holes for receiving fastening devices, the housing holes having a housing hole spacing corresponding to at least one pair of cladding hole spacings.

In the context of the present invention, a hole, in particular a housing hole or cladding hole, is understood to mean any opening for receiving fastening devices, regardless of the manner in which the opening was made.

Thus, one point of the invention is that the cargo hold has housing elements in which electronic components and/or cables are housed. In particular, this allows cables to run in dedicated housing elements, separating them from other cable systems. The housing holes according to the invention also allow the housing elements to be attached to the cladding elements, since both components have corresponding drilling distances.

In one embodiment, a housing element is mounted on one of the cladding elements. Such an installation type is known in building technology under the term surface mounting. In the cargo hold of an aircraft, several of the above-mentioned problems of a conventional type of installation are solved in this way: for example, cutouts in the cladding elements are no longer required, since the housing elements are mounted above/outside the cladding elements. In addition to simpler installation, this also offers the advantage that the fire protection properties of the cladding elements are retained. Furthermore, separation rules to other cable systems running behind the cladding are adhered to, as the cladding elements serve as separation.

The housing elements are preferably optionally designed as a cable duct for guiding a cable, as a connecting element for connecting several cable ducts or as a housing box for an electrical component and/or display device. The electrical component can be a switch, for example a rocker switch.

According to the invention, it is possible to use housing elements of only one shape, for example in the form of cable ducts. However, an embodiment in which all three types of housing elements are used in combination is preferred. In this way, a complex system of housing elements can be realized, taking into account the spatial requirements of the aircraft.

In one embodiment, a cable duct has a symmetrical cross-section, in particular a semi-elliptical cross-section, and/or at least one central web segment. The central web segment may be arranged to divide an interior region of the cable duct (in the longitudinal direction) into at least two inner ducts. Such a structure provides additional structure to the cavity of the cable duct, which can be used advantageously when arranging the cables.

In a preferred embodiment, the cargo hold includes at least one cargo loading system having at least one cable and at least one housing element in the form of a cable duct, wherein the cable duct accommodates at least one cable of the cargo loading system. The cable may be, for example, a control cable of roller drive units. Further, various other actuators may be provided in addition to or in place of the roller drive units. Additionally, the cargo compartment may be equipped with sensors, for example, overlap sensors for determining the position of the cargo and/or fire sensors. According to the invention, the necessary cables and/or components can be accommodated in the housing elements according to the invention.

Connecting elements are preferably designed to connect two or three or four cable ducts. This makes it possible to connect a corresponding number of cable ducts together at crossing points so that a branched cable duct system can be created overall.

In one embodiment, a connecting element has a guide element, in particular a guide ring. This design enables a cable to be neatly guided inside the connecting element, in particular along curved sections.

Preferably, the housing elements are made of flame-retardant material, in particular polyamide 12. This allows compliance with official requirements for burn-through safety. Polyamide 12, for example, meets the UL 94 HB fire classification test for plastics.

In one embodiment, the housing elements are manufactured using an injection molding process, which allows for low-cost manufacturing. Alternatively, a housing element may be formed for mounting at or on a floor of the cargo deck. In this case, the raw material is preferably a metal alloy, in particular an aluminum alloy, from which the housing element is preferably formed in an extrusion process. Such a manufacturing form increases the stability of the housing element.

The object is further solved by a housing element for accommodating electronic components and/or cables. Here, the housing element has at least two housing holes for mounting on a cladding element. The housing holes have a housing hole spacing corresponding to at least one pair of cladding hole spacings.

Furthermore, the aforementioned object is solved by an aircraft having a cargo hold in accordance with the present disclosure. In one embodiment, the aircraft has one of the cargo holds already described and/or the housing element described or a plurality thereof.

Similar advantages result as have already been described in connection with the cargo hold according to the invention.

Furthermore, the object is solved by a method for mounting housing elements in a cargo hold of an aircraft, preferably in the course of a conversion of a passenger compartment into the cargo hold, wherein the method comprises the following steps:

removing fastening devices, with which cladding elements are fixed on structural elements, from fastening receptacles of the structural elements;

mounting of the housing elements with prefabricated housing holes on the cladding elements using the fastening receptacles, wherein fastening devices are introduced into the housing holes and fastened in the fastening receptacles, and arranging cables, preferably equipped with plug-in connections, in cavities of at least some housing elements.

One aspect of the method is that fastening devices, for example screws, are inserted through the housing holes and the existing cladding holes into the fastening receptacles, for example screw holes, of the structural elements in order to fasten the housing elements. In this way, the housing elements can be mounted on the cladding elements without having to machine the surface of the cladding elements. In particular, the burn-through resistance of the cladding elements is thus maintained.

In addition, the above installation method causes the cladding elements to be held to the structural elements by the housing elements. Particularly in the case of large cable ducts formed from a metal alloy, this can provide a particularly stable attachment of the cladding elements to the structural elements.

The effort required for arranging cables according to the described process is much lower here compared with arranging cables behind the cladding elements. In particular, this step can be performed outside the aircraft. The use of plug-in connectors allows cables and/or electrical components to be arranged in sections in the cavities of the housing elements and to be connected to form a system only in the aircraft.

In one embodiment, a method comprises the step of fabricating at least one housing element having housing holes that have a housing hole spacing substantially corresponding to a fastening receptacle hole spacing. In this way, housing elements can later be attached to structural elements without the need to create corresponding housing holes during assembly.

Particularly preferred is an embodiment in which the manufacturing comprises at least one of the following steps: an extrusion, an injection molding, in particular of a polyamide 12, a 3D printing, a mold lamination of a glass fiber-reinforced plastic, in particular of a glass fiber epoxy resin. In particular, injection molding allows housing elements to be provided directly with housing holes without requiring a further manufacturing step for this purpose.

Further embodiments are disclosed herein.

BRIEF DESCRIPTION OF THE DRAWINGS

The invention is described below with reference to exemplary embodiments, which are explained in more detail with reference to the figures, which show as follows.

In the following description, the same reference numbers are used for identical parts and parts with the same effect.

DETAILED DESCRIPTION

Figure 1:
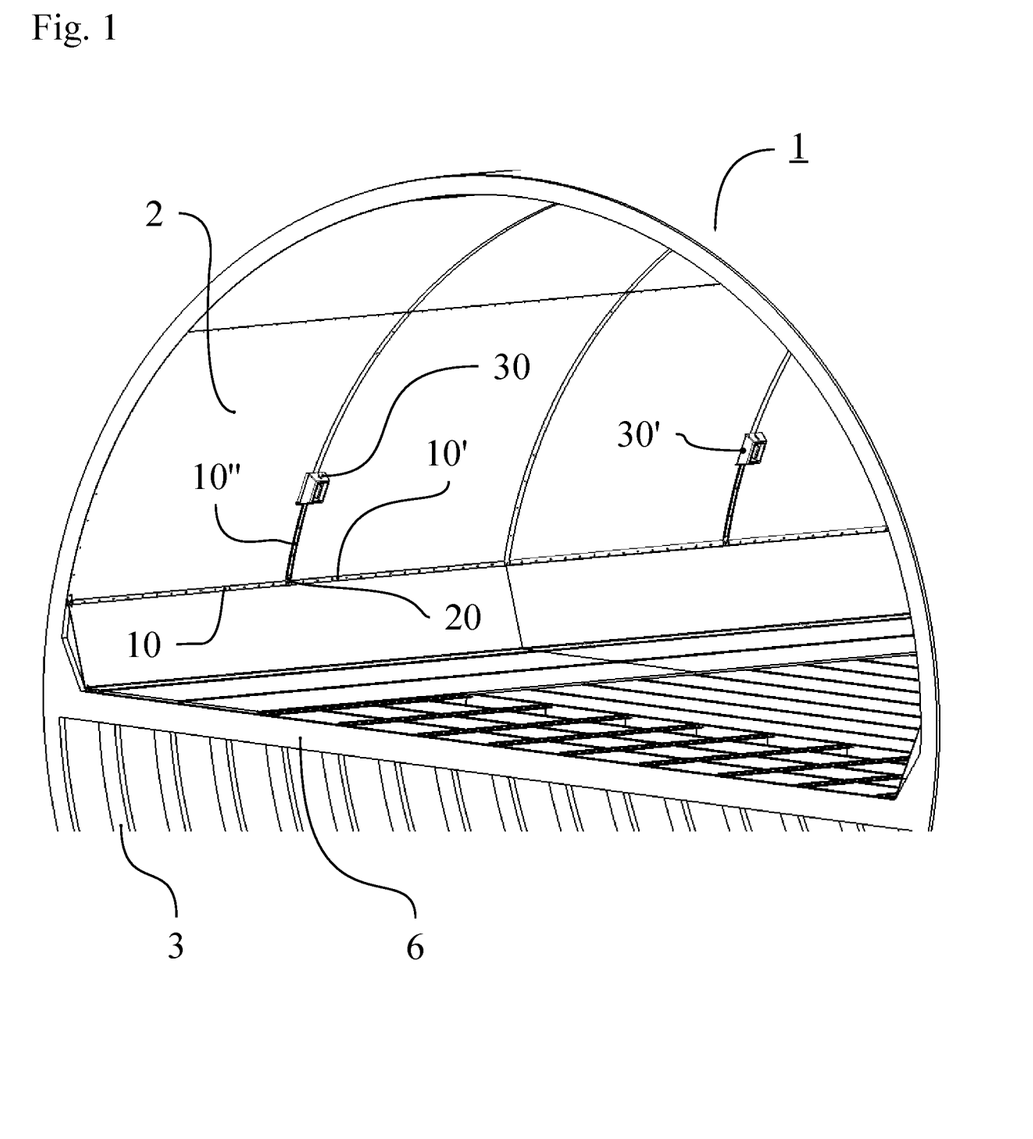
FIG. 1 shows a cargo hold with cladding elements and housing elements in the mounted state.

FIG. 1 shows the upper deck ("main deck") of a cargo aircraft having a cargo hold 1. The cargo hold 1 is covered with several rectangular, curved panels 2, which are attached to frames 3 of the cargo aircraft.

Various housing elements according to the invention in the form of cable ducts 10, 10', 10" as well as a T-piece 20 as a connecting element for the cable ducts 10, 10', 10" and two housing boxes 30, 30' are mounted on the panels 2.

In the exemplary embodiment, the housing boxes 30, 30' serve to receive switching rockers 31, by means of which roller drive units (not shown), for example, can be controlled. Such roller drive units are usually mounted on the cargo hold floor 6 and serve to convey cargo in the longitudinal direction of the aircraft. Common roller drive units support two conveying directions.

In order to ensure that the switching rockers 31 can be reached conveniently by the loading personnel, the housing boxes 30, 30' are mounted on the panels 2 at handle height (approx. 1.2 meters) above the cargo compartment floor 6.

A number of cable ducts, in particular the first cable duct 10 and the second cable duct 10', are arranged one behind the other in such a way that they form a cable guide running essentially over the entire length of the cargo hold 1 and extending on the panels 2 (approx. 0.5 meters from the cargo hold floor). At the level of the first housing box 30, the third cable duct 10" branches off vertically from the cable guide extending in the longitudinal direction and leads upwards to the first housing box 30. The first housing box 30 encloses the third cable duct 10" in such a way that the cables running in the third cable duct 10" are completely covered.

The cables may be cables for a bus, so that control commands detected by means of the switching rockers 31 can be communicated to the roller drive units and/or a control computer (not shown). Such cables may, for example, be in the form of round cables having a thickness of 6 to 12 mm.

At the intersection of the cable ducts 10, 10', 10", the T-piece 20 is inserted to connect the cable ducts 10, 10', 10".

Figure 2:
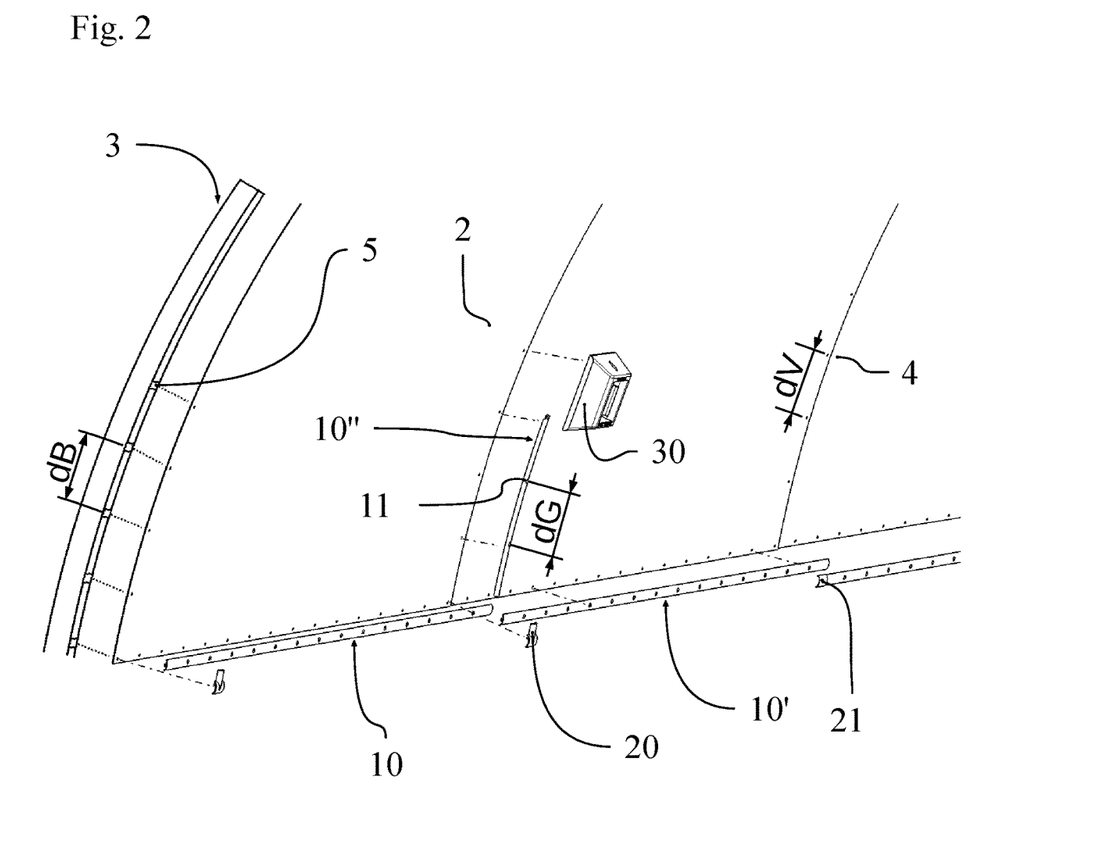
FIG. 2 shows housing elements mounted on cladding elements (exploded view)

FIG. 2 shows in detail the attachment of the cable ducts 10, 10', 10", the T-piece 20, a connecting element 21 and the first housing box 30 to the panels 2.

It is common for the panels 2 to have a plurality of cladding holes 4 at regular cladding hole spacing dV, in which fastening screws are arranged to hold the panels 2 to the frames 3. The housing elements according to the invention, in particular the cable ducts 10, 10', 10" are mounted using these cladding holes 4.

For this purpose, the cable ducts 10, 10', 10" have a plurality of housing holes 11, each of which is provided at a housing hole spacing dG. In the exemplary embodiment, the housing hole spacing dG coincides with the cladding hole spacing dV, i.e. dG=dV. The cable ducts 10, 10', 10" are arranged in such a way that the housing holes 11 exactly cover a part of the cladding holes 4. In the exemplary embodiment according to FIG. 2, the cable ducts 10, 10', 10" are each held to the panels 2 by a plurality of fastening screws.

The first housing box 30 has two housing holes 11, with one arranged at the upper end and one at the lower end of the first housing box 30. The housing hole spacing dG between the housing holes 11 also corresponds here to the cladding hole spacing dV. Furthermore, the first housing box 30 is positioned such that its two housing holes 11 are located exactly above a pair of cladding holes 4 of the panels 2. Two screws are therefore provided for fastening the first housing box 30, which pass through the housing holes 11 and cladding holes 4.

A single housing hole 11 is provided in each case for mounting the T-piece 20 and the connecting element 21 on the panels 2. The cable ducts 10, 10', 10" are dimensioned precisely so that the respective T-piece 20 comes to lie above the housing hole 4 and can be screwed on accordingly.

In an alternative exemplary embodiment, the housing hole spacing dG between two housing holes 11 of a housing element, for example the third cable duct 10", is not equal to the housing hole spacing dV, but is many times greater. Thus, dG=n·dV applies, where n is a natural number. This is particularly advantageous if the panels 2 have a large number of cladding holes 4 at a short distance apart, but a few fastening means at a greater distance apart are sufficient for fastening the third cable duct 10". Case n=3 thus corresponds, for example, to the case in which every third cladding hole 4 of a panel 2 coincides with a housing hole 11 of the second cable duct 10".

Figure 3:
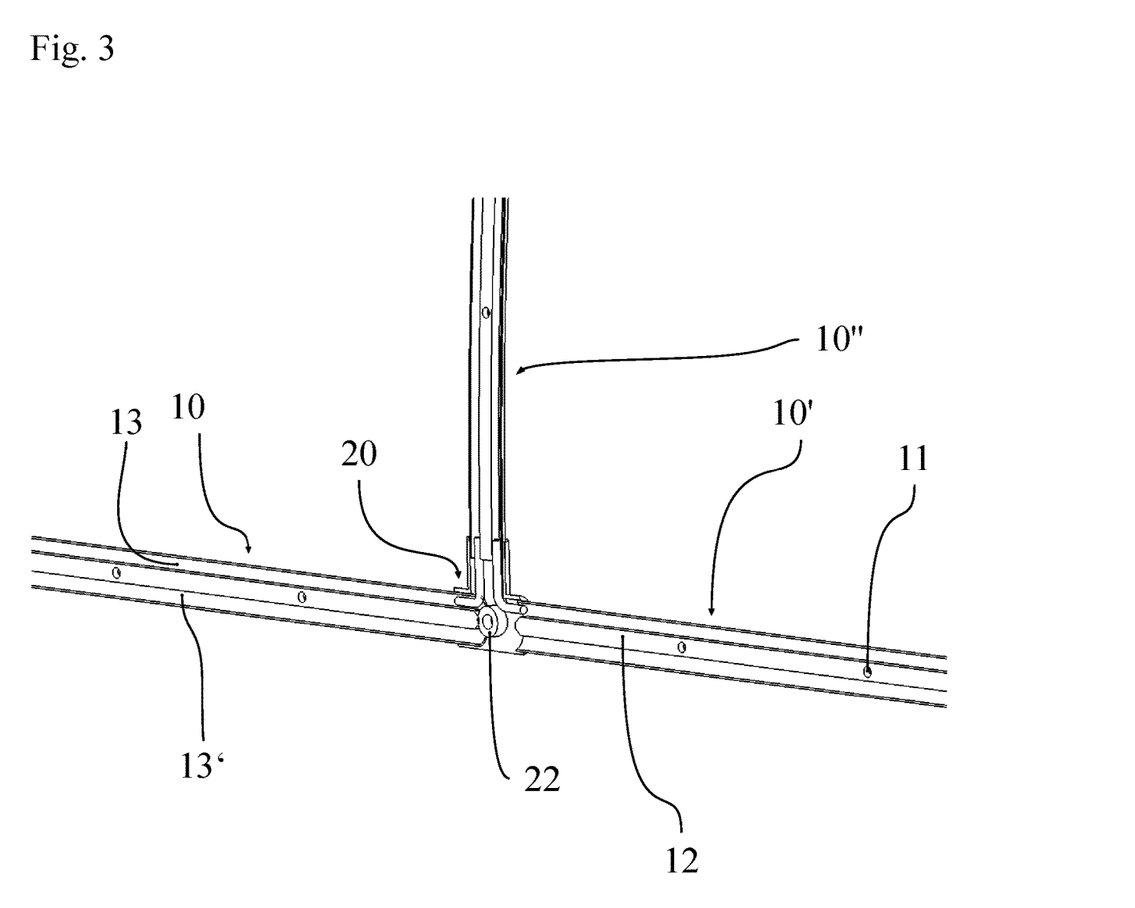
FIG. 3 shows a connecting element for three cable ducts.

FIG. 3 shows a rear view of the three cable ducts 10, 10', 10" connected by the T-piece 20.

The cable ducts 10, 10', 10" have an open, thin-walled profile (e.g. wall thickness=2 or 3 mm) with an approximately semicircular cross-section (for example with a diameter of 8 to 15 mm).

In addition, the cable ducts 10, 10', 10" have continuous central webs 12. These are arranged in such a way that two inner ducts 13, 13' are formed in each of the cavities of the cable ducts 10, 10', 10", which are separated from the central webs 12.

When arranging cables in the cavities of the cable ducts 10, 10', 10", this structure can be used to separate different cables. For example, one of two cables or cable bundles, one of which is used to feed the switching rocker 31 and the other to pass on a signal, can each be placed in the inner ducts 13, 13' of the third cable duct 10".

The housing holes 11 of the cable ducts 10, 10', 10" are arranged so that they penetrate the central web 12. Thus, in addition to separating the cables, the central webs 12 ensure that the cable ducts 10, 10', 10" are not deformed when the screws are tightened.

A guide ring 22 is provided in the T-piece 20, which serves to guide a fastening screw. The cables running along the bent sections between cable duct 10 and 10" or 10' and 10" can be arranged tangentially around the guide ring 22.

The central webs 12 shown in FIG. 3 have a substantially rectangular cross-section. Alternatively, geometrically more complicated cross-sections are conceivable, resulting in more than two inner ducts 13, 13', for example three or four. In this way, the cable routing can be structured even better, which can greatly facilitate maintenance work.

Figure 4:
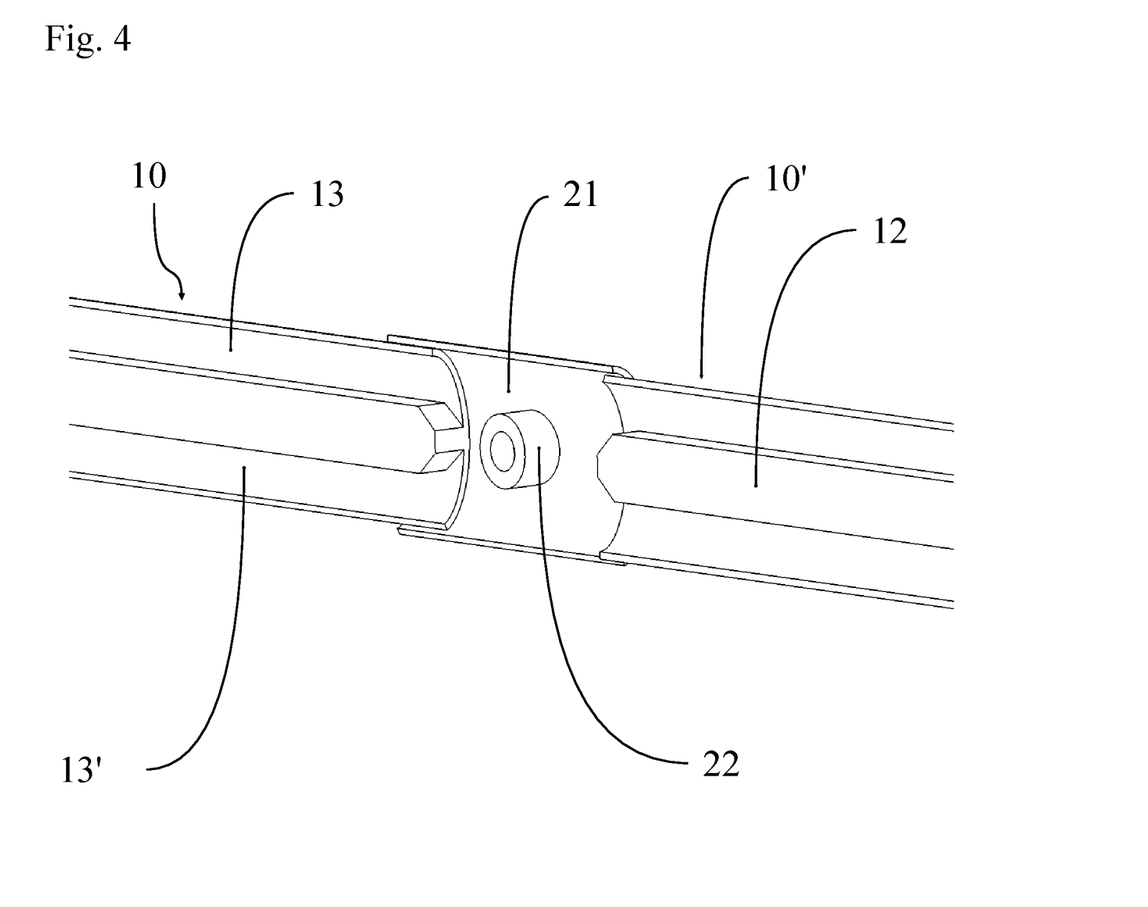
FIG. 4 shows a connecting element for two cable ducts.

FIG. 4 shows an exemplary embodiment in which, unlike the exemplary embodiment according to FIG. 3, no branch is provided at the transition between the first cable duct 10 and the second cable duct 10'. Instead of the T-piece 20 according to FIG. 3, the connecting element 21 is placed at the interface. A guide ring 22 for guiding a fastening screw is also installed in the connecting element 21.

Figure 5:
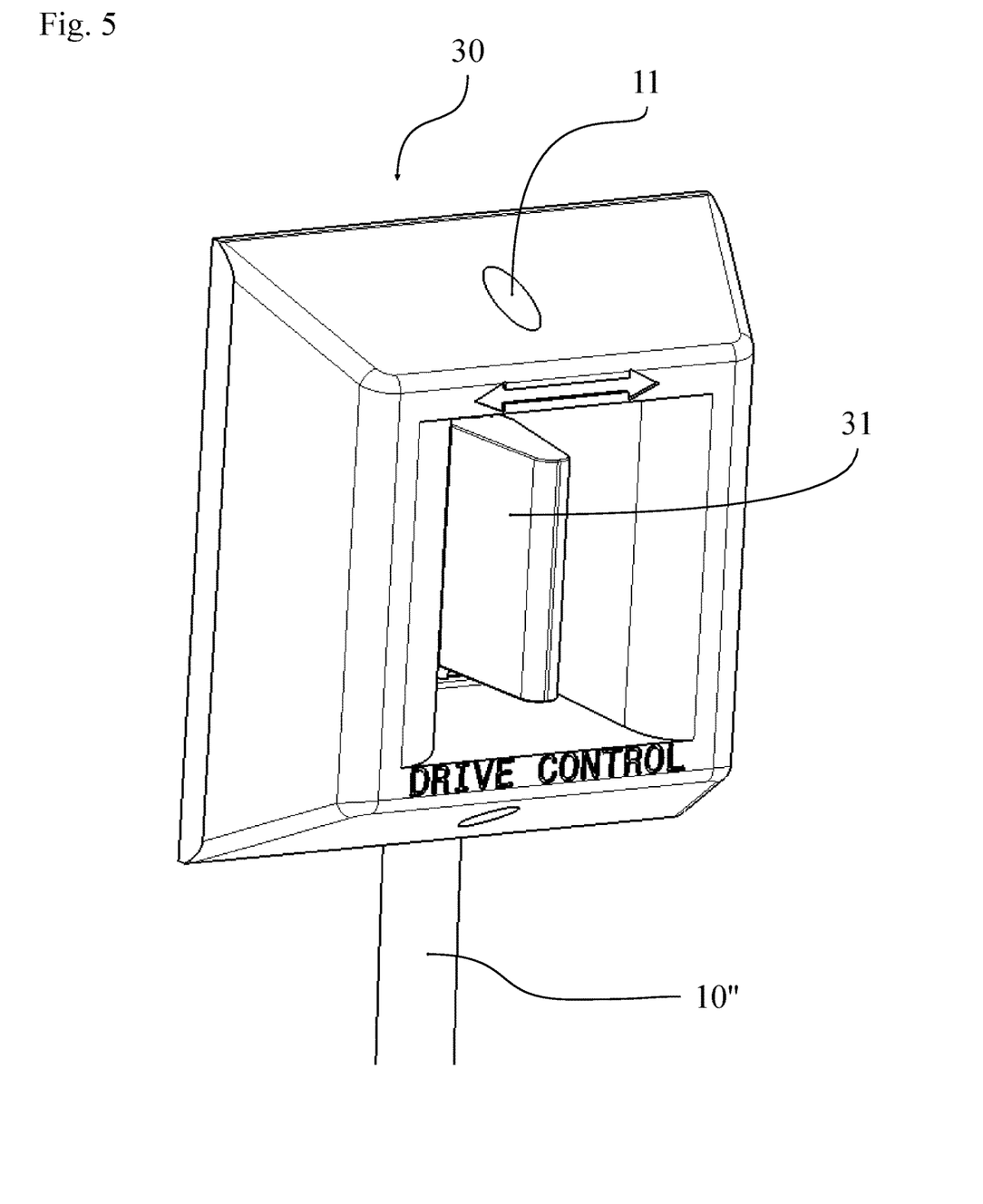
FIG. 5 shows a housing element for a rocker switch.

FIG. 5 shows a detailed view of the first housing box 30 in which the switching rocker 31 for controlling a roller drive unit is housed. The connecting cables leading to the switching rocker 31 are received in the third cable duct 10", which leads vertically downwards away from the first housing box 30. Labels for operating the switching rocker 31 are provided on the surface of the housing box 30. The first housing box 30 has a housing hole 11 at each of its upper and lower ends and is mounted as described earlier.

Figure 6:
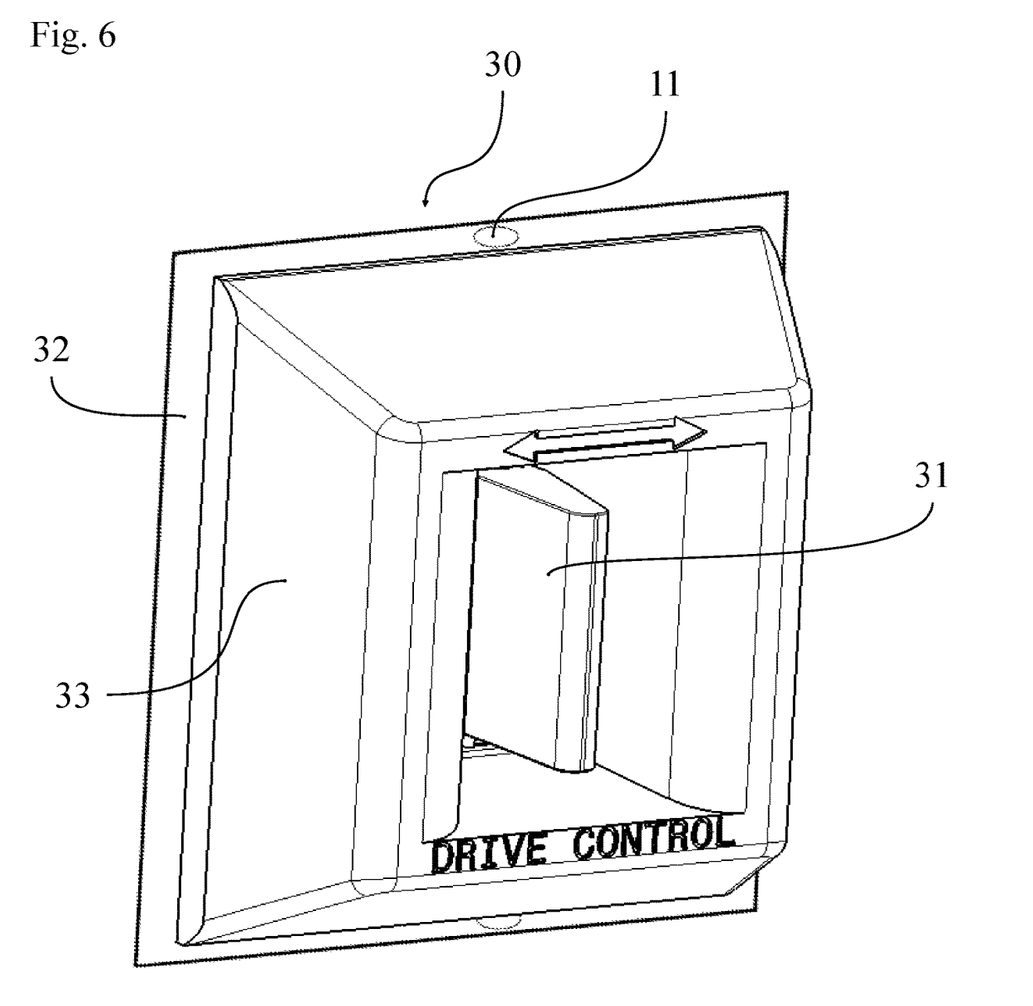
FIG. 6 shows a housing element for a switching rocker according to an alternative exemplary embodiment.

FIG. 6 shows another exemplary embodiment of the first housing box 30. Here, the first housing box 30 comprises a mounting plate 32 and a housing frame 33. In this case, the housing holes 11 are located on the mounting plate 32. The housing frame 33 sits on the mounting plate 32 and is clamped or plugged there, for example.

In principle, a two-part design, as in this exemplary embodiment by means of mounting plate 32 and housing frame 33, is also conceivable for other housing elements according to the invention. For cable ducts 10, 10', 10" in particular, this can have the advantage that the cables can be accessed (for example for maintenance work) without having to undo the fastening screws of the cable ducts and thus the panels 2.

With reference to FIGS. 1 and 2, it is also possible to describe the assembly of the cable ducts 10, 10', 10", the T-piece 20 and the first housing box 30 in accordance with a method according to the invention. Such a procedure may be advantageous, for example, in the course of converting a passenger compartment into the cargo hold 1.

In this exemplary embodiment, prefabricated cable ducts 10, 10', 10" are used in which the housing hole spacing dG corresponds to the cladding hole spacing dV. In addition, cables are pre-routed in the cavities of the cable ducts 10, 10', 10" and equipped with plug-in connectors.

The first step is to remove selected fastening screws with which the panels 2 are bolted to the frames 3. This exposes not only the cladding holes 4 of the panels 2 but also the fastening receptacles 5 of the frames 3.

This is followed by the assembly of the cable ducts 10, 10', 10" and the first housing box 30 on the panels 2. For this purpose, the housing holes 11 are aligned with the respective cladding holes 4 of the panels 2. Suitable screws are then inserted into the fastening receptacles 5, with the screws penetrating both the housing holes 11 and the cladding holes 4.

Once the cable ducts 10, 10', 10" and the first housing box 30 have been fitted in this way, the cables can be connected to each other via the plug-in connectors. Finally, the T-piece 20 is mounted so that it completely covers the cables running in the cable ducts 10, 10', 10".

By using the existing cladding holes 4 on the panels 2, the cable ducts 10, 10', 10" as well as the T-piece 20 and the first housing box 30 can thus be mounted without damaging the surface of the panels 2. Since the panels 2 are burn-through resistant and the housing elements are preferably made of flame-retardant material, in particular polyamide 12, the panels 2 with the housing elements mounted thereon continue to act as an intact burn-through barrier in the aircraft. In addition, the panels 2 ensure that the minimum distance between cables running in the cable ducts 10, 10', 10" to further cable systems running behind the panels 2 is easily maintained or extended.

The exemplary embodiments described so far have in common that the housing elements used exclusively house cables and/or electronic components. However, fastening to cladding elements using existing fastening devices, one of the basic ideas of this invention, is in principle possible for objects and devices of any kind. This seems particularly useful for devices for which easy access in the cargo hold should be possible. The mounting method according to the invention results in similar advantages as in the exemplary embodiments described above.

At this point, it should be pointed out that all parts described above are to be regarded individually—even without features additionally described in the respective context, even if these have not been explicitly identified individually as optional features in the respective context, e.g. by using: in particular, preferably, for example, e.g., optionally, round brackets, etc.—and in combination or any sub-combination as independent designs or further developments of the invention as defined in particular in the introduction to the description. Deviations therefrom are possible. Specifically, it should be noted that the word in particular or round brackets do not indicate any features that are mandatory in the respective context.

LIST OF REFERENCE SIGNS

1 Cargo hold
2 Panel
3 Frames
4 Cladding hole
5 Fastening hole
6 Cargo hold floor
10, 10', 10" Cable duct
11 Housing hole
12 Central web
13 First inner duct
13' Second inner duct
20 T-piece
21 Connecting element (for connecting two cable ducts)
22 Guide ring
30, 30' Housing box
31 Switching rocker
32 Mounting plate
33 Housing frame
dB Fastening receptacle hole spacing
dG Housing hole spacing
dV Cladding hole spacing

The invention claimed is:

1. A cargo hold of an aircraft, comprising:
cladding elements each having a first side and an opposite second side, wherein the cladding elements are attached to supports of the aircraft with the first side arranged toward the supports, wherein the cladding elements have a plurality of cladding holes with predefined cladding hole spacings for attachment, and
at least one housing element for accommodating electronic components and/or cables,
wherein the housing element has at least one pair of housing holes for receiving fastening devices, wherein the housing holes have a housing hole spacing corresponding to at least one pair of cladding hole spacings, wherein the at least one pair of housing holes of the at least one housing element are aligned with the at least one pair of cladding holes along the second side of a corresponding one of the cladding elements, and
wherein the fastening devices extend through the at least one pair of housing holes and the at least one pair of cladding holes for attaching the corresponding one of the cladding elements to the supports and for mounting the at least one housing element on the corresponding one of the cladding elements.

2. The cargo hold according to claim 1, further comprising:
at least one cargo loading system having at least one cable, and
at least one housing element in the form of a cable duct, wherein the cable duct accommodates at least one cable of the cargo loading system.

3. The cargo hold according to claim 1, wherein at least one housing element is made of a flame-retardant material.

4. The cargo hold according to claim 1, wherein at least one of the housing elements is manufactured in an injection molding process and/or is formed of a metal alloy for mounting at or on a floor of a cargo deck.

5. The cargo hold according to claim 1, wherein at least one of the housing elements is designed as
a cable duct for guiding a cable,
a connecting element for connecting a plurality of cable ducts, or
a housing box for an electrical component.

6. The cargo hold according to claim 5, wherein:
the at least one housing element in the form of a cable duct has
a symmetrical cross-section, and/or
at least one central web segment, which is arranged such that the central web segment divides an inner region of the cable duct (in the longitudinal direction) into at least two inner ducts.

7. The cargo hold according to claim 5, wherein the at least one housing element in the form of a connecting element is configured for connecting two or three or four cable ducts and/or has a guide element.

8. A housing element for housing electronic components and/or cables for a cargo hold according to claim 1.

9. An aircraft having a cargo hold according to claim 1.

10. A method for mounting a plurality of housing elements including the at least one housing element in a cargo hold of an aircraft according to claim 1, the method comprising:
   dismounting the plurality of housing elements from structural elements of the aircraft by removing fastening devices from fastening receptacles of the structural elements;
   arranging the plurality of housing elements along the second side of the cladding elements and aligning housing holes of the plurality of housing elements and cladding holes of the cladding elements with the fastening receptacles,
   extending the fastening devices through the housing holes and the cladding holes and into the fastening receptacles for mounting the plurality of housing elements on the cladding elements, and
   arranging cables in cavities of at least some of the housing elements of the plurality of housing elements.

11. The method according to claim 10, further comprising the step of:
   fabricating at least one housing element of the plurality of housing elements with housing holes having a housing hole spacing substantially equal to a fastening receptacle hole spacing.

12. The method according to claim 11, wherein the step of fabricating comprises:
   an extrusion; and/or
   an injection molding; and/or
   a 3D printing; and/or
   a mold lamination of a glass fiber reinforced plastic.

* * * * *